No. 681,792. Patented Sept. 3, 1901.
O. HUFFMAN.
WINDOW OR DOOR SCREEN.
(Application filed May 11, 1901.)
(No Model.)
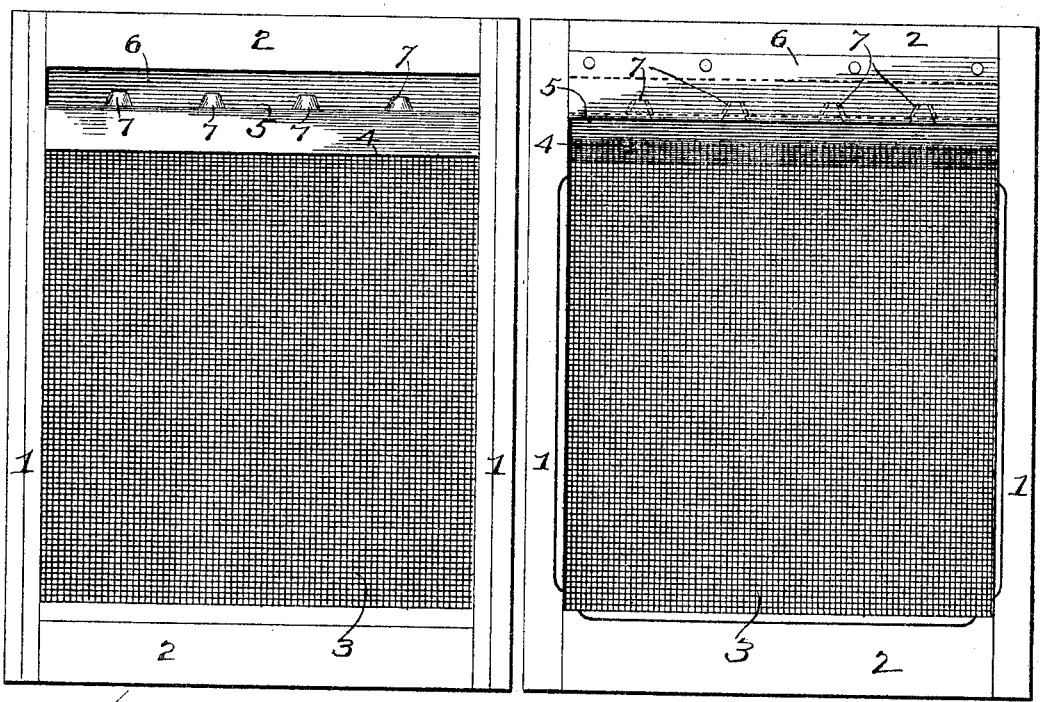
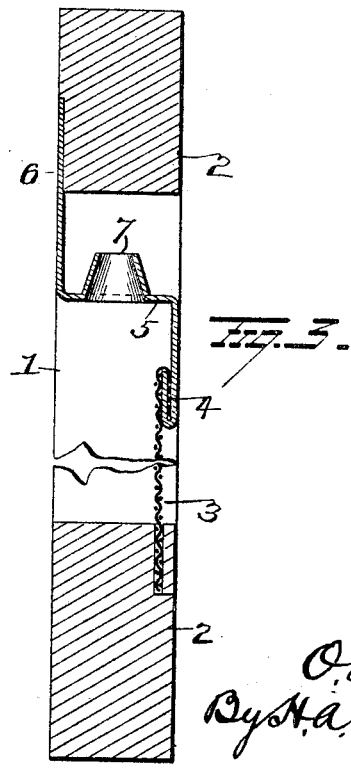
WITNESSES
INVENTOR
O. Huffman
By H. A. Seymour
Attorney

UNITED STATES PATENT OFFICE.

ORLANDO HUFFMAN, OF BEATRICE, NEBRASKA, ASSIGNOR OF TWO-THIRDS TO HENRY FISHBACK AND WILLIAM BOSWORTH, OF SAME PLACE.

WINDOW OR DOOR SCREEN.

SPECIFICATION forming part of Letters Patent No. 681,792, dated September 3, 1901.

Application filed May 11, 1901. Serial No. 59,756. (No model.)

*To all whom it may concern:*

Be it known that I, ORLANDO HUFFMAN, a resident of Beatrice, in the county of Gage and State of Nebraska, have invented certain new and useful Improvements in Window or Door Screens; and I do hereby declare the following to be a full, clear, and exact description of the invention, such as will enable others skilled in the art to which it appertains to make and use the same.

My invention relates to an improvement in window and door screens, the object of the invention being to provide an improved device of this character which will permit flies and other insects to escape from the house, but prevent their return.

With this object in view the invention consists in certain novel features of construction and combinations and arrangements of parts, as will be more fully hereinafted described, and pointed out in the claims.

In the accompanying drawings, Figure 1 is a view of the outside of the screen, illustrating my improvements. Fig. 2 is a view of the inside, and Fig. 3 is a view in vertical section.

1 1 represent uprights, and 2 2 the upper and lower horizontal members, secured at their ends to the uprights in any approved manner to form the rectangular frame of the screen. To the outside of the frame a wire netting or screen 3 is secured at its sides and lower edge to the vertical members 1 and lower horizontal member 2 of the frame by tacks or other approved means and is secured at its upper edge in the longitudinally bent and clamped lower edge 4 of a lip on a sheet-metal partition or platform 5, which latter is bent at its inner edge, forming a plate 6, secured to the inner face of the upper horizontal member 2, thus disposing the partition or platform 5 parallel with the upper member 2 and forming an outlet chamber or space between the partition or platform and the upper member 2, while the lip 4 is bent upon itself to form a clamp to receive and secure the upper edge of the screen 3, as above explained.

The partition or platform 5 is provided with a series of holes, around which truncated conical projections 7 are secured to permit the flies or other insects in the house to pass up through the cones 7 into the outlet-chamber between platform 5 and upper member 2, but owing to the contracted upper end of the cones and the fact that they project above the platform making it difficult for the flies or other insects to find their way into the house.

Various slight changes might be resorted to in the general form and arrangement of the several parts described without departing from the spirit and scope of my invention, and hence I would have it understood that I do not wish to limit myself to the precise details set forth, but consider myself at liberty to make such slight changes and alterations as fairly fall within the spirit and scope of my invention.

Having fully described my invention, what I claim as new, and desire to secure by Letters Patent, is—

1. A screen comprising a frame, a partition secured to the inner face of the frame and having a transversely-disposed perforated portion located between the upper and lower members of the frame, hollow truncated cones disposed upon the transverse portion of the partition and communicating with the perforations therein and a wire-netting connected with the outer edge of the partition and to the frame.

2. A screen comprising a rectangular frame, a sheet-metal partition near the upper member of the frame and secured thereto, said partition having a perforated portion disposed transversely under the upper member of the frame, truncated conical projections on the upper face of the transverse portion of the partition communicating with perforations therein and a wire-netting connecting the partition and the lower and side sections of the frame.

3. In a screen, the combination with a rectangular frame, a metal plate secured to the upper section of the frame and bent at right angles forming a transverse portion having holes and disposed parallel with said upper section and spaced therefrom and again bent at right angles forming a lip, a wire-netting clamped to the lower edge of the lip and secured to the side sections of the frame below the partition and to the bottom or lower section of said frame, and truncated conical projections on the transverse portion of the partition communicating with holes therein.

In testimony whereof I have signed this specification in the presence of two subscribing witnesses.

ORLANDO HUFFMAN.

Witnesses:
JACOB AUCH,
W. A. PENNER.